United States Patent [19]

Okuyama et al.

[11] Patent Number: 4,858,901

[45] Date of Patent: Aug. 22, 1989

[54] END HOLDER FOR BAND-LIKE MATERIAL

[75] Inventors: Kouji Okuyama; Hiroki Touya, both of Tokyo, Japan

[73] Assignee: Bridgestone Corporation, Tokyo, Japan

[21] Appl. No.: 201,142

[22] Filed: Jun. 2, 1988

[30] Foreign Application Priority Data

Jun. 4, 1987 [JP] Japan ................. 62-140406

[51] Int. Cl.$^4$ ............................................. B66C 1/02
[52] U.S. Cl. ........................................ 269/21; 269/34;
269/156; 269/268; 294/64.1
[58] Field of Search ............... 271/90; 294/64.1, 65;
269/21, 289 MR, 156, 909, 268, 34

[56] References Cited

U.S. PATENT DOCUMENTS

| | | | |
|---|---|---|---|
| 3,578,372 | 5/1971 | Schuler | 294/64.1 |
| 4,470,866 | 9/1984 | Satoh et al. | |
| 4,526,647 | 7/1985 | Portalupi et al. | |
| 4,567,081 | 1/1986 | Van Horne | 271/90 |
| 4,635,988 | 1/1987 | Potters et al. | 294/64.1 |

FOREIGN PATENT DOCUMENTS

| | | | |
|---|---|---|---|
| 95647 | 12/1983 | European Pat. Off. | 271/90 |
| 58-42445 | 3/1983 | Japan. | |
| 59-207227 | 11/1984 | Japan. | |
| 60-44448 | 3/1985 | Japan. | |
| 60-54841 | 3/1985 | Japan. | |
| 60-79938 | 5/1985 | Japan. | |

Primary Examiner—Robert C. Watson
Attorney, Agent, or Firm—Sughrue, Mion, Zinn, Macpeak & Seas

[57] ABSTRACT

A device for holding an end portion of a band-like material comprising a frame, a suctional attraction roller rotatably supported by the frame and having a suctional attraction part at the periphery of the roller, and a pincher which is supported by the frame and can be moved toward and away from the peripheral surface of the roller. The end portion of the band-like material is attracted by the suctional attraction roller through suction. The roller is thereafter turned so that the end portion of the band-like material is wound upward. The pincher is then moved toward the suctional attraction roller so that the end portion of the band-like material is surely held by the pincher and the roller.

6 Claims, 4 Drawing Sheets

END HOLDER FOR BAND-LIKE MATERIAL

BACKGROUND OF THE INVENTION

This invention relates to a device for holding the end portion of a band-like material.

A conventional device for holding the end portion of a band-like material includes a frame and a suction attraction bar which is secured to the frame. A vacuum suction passage extends in the longitudinal direction of the bar and a plurality of suction holes communicate with the vacuum suction passage and are open in the outside surface of the suctional attraction bar. The holes are located at a spaced distance from each other in the longitudinal direction of the bar. The suctional attraction bar is pushed on the end portion of the band-like material and air is thereafter sucked through the suction holes and the vacuum suction passage so that the end portion of the band-like material is held through suction attraction. All the suction holes of the device communicate with the vacuum suction passage. For that reason, there is no problem if all the suction holes are closed by the band-like material at the time of the suction attraction thereof. However, if the width of the band-like material is so small that some of the suction holes are open to the atmosphere, there is a problem that the pressure in the vacuum suction passage rises to reduce the suctional attraction power of the device to let the suction-attracted band-like material deviate relative to the suction attraction bar or come off it.

It is possible to provide the suction holes with valves and open or close the valves depending on the width of the band-like material, in order to solve the above-mentioned problem. However, if such is done, there are other problems in that the control and thus modified construction of the conventional device are complicated and the cost thereof is increased.

Since there is a limit to the suctional attraction power of the conventional device, there is still another problem that the band-like material deviates relative to the suctional attraction bar or comes off it if a strong external force acts to the band-like material.

SUMMARY OF THE INVENTION

This invention was made in order to solve the above-mentioned problems.

Accordingly, it is an object of the present invention to provide a device for holding the end portion of a band-like material and in which a frame, a suction attraction roller rotatably supported by the frame and having a suction attraction part at the periphery of the roller, and a pincher which is supported by the frame and can be moved toward and away from the peripheral surface of the roller are provided. The end portion of the band-like material is attracted by the suctional attraction roller through suction. The roller is thereafter turned so that the end portion of the band-like material is wound upward. The pincher is then moved toward the suction attraction roller so that the end portion of the band-like material is held by the pincher and the roller.

When the end portion of the band-like material is to be retained by the pincher and the suctional attraction roller, the roller is first pushed on the end portion of the band-like material so that the end portion is attracted by the suction attraction portion of the roller through suction. The suction attraction roller is then turned by a prescribed angle so that the attracted end portion of the band-like material is wound upward. At that time, the roller may be either forcibly turned by a turning device or translated and then turned by the friction on the band-like material. After that, the pincher is moved toward the suction attraction roller so that the upwardly-wound end portion of the band-like material is held at both the sides thereof by the pincher and the suction attraction roller.

Since the end portion of the band-like material is held by the pincher and the suction attraction roller, the band-like material can be firmly and continuously held in a fixed position even if the width of the material is small so as to reduce the suctional attraction power thereon or a strong external force acts on the band-like material.

Since the suction attraction roller which is rotatable and the pincher which is moved toward and away from the roller are provided as the only main components of the device, the construction and control of the device are simpler than those of a device having a complicated valve mechanism and a controller therefor and the cost of the former device is lower than that of the latter.

Since the suction attraction portion of the suctional attraction roller is required only to apply a force strong enough to wind the end portion of the band-like material upward, the suction attraction portion can effectively act even if the width of the band-like material is so small as to reduce the suctional attraction power of the device.

DETAILED DESCRIPTION OF AN EXEMPLARY EMBODIMENT

A preferred embodiment of the present invention is hereafter described in detail with reference to the drawings attached hereto.

Figure 1:
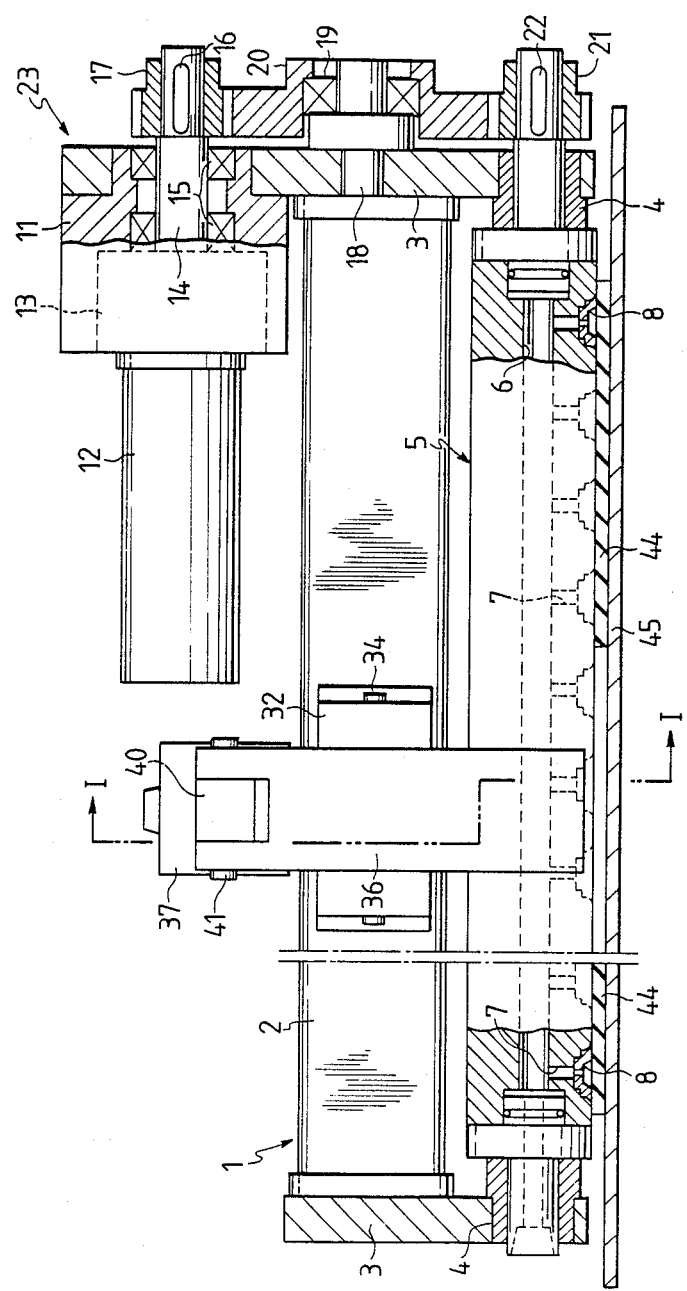
FIG. 1 shows a cutaway front view of a device first embodiment of the present invention.
Figure 2:
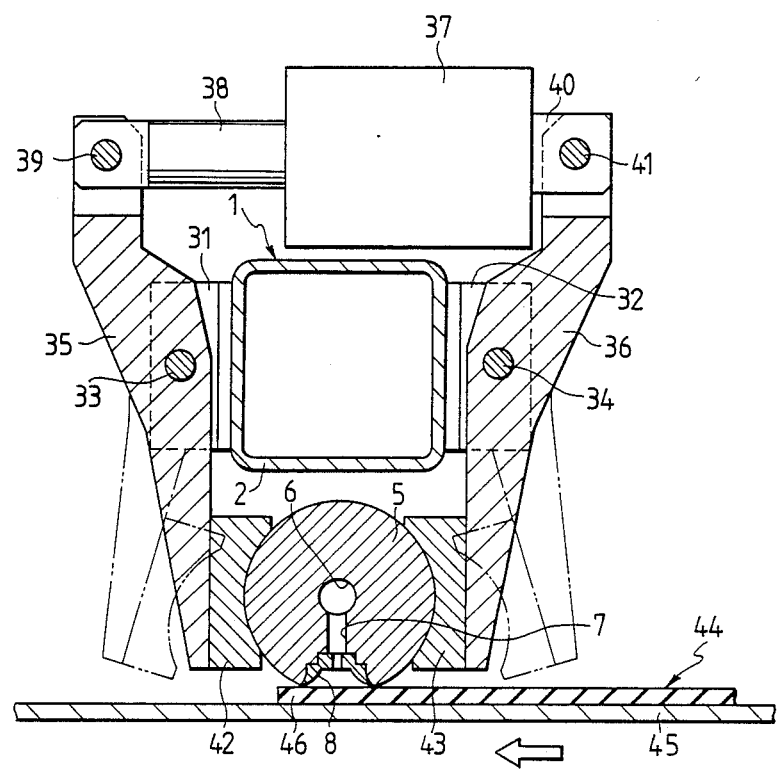
FIG. 2 shows a sectional view of the invention along a line I—I shown in FIG. 1.

FIGS. 1 and 2 show a frame 1 which is moved by a drive mechanism not shown in the drawings and comprises a horizontal beam 2 and plates 3 secured to both the ends of the beam. A suctional attraction roller 5 of circular cross section is provided under the horizontal beam 2 in parallel therewith and rotatably supported at both the ends of the roller by bearings 4 in the plates 3. A vacuum suction passage 6 is provided in the suctional attraction roller 5 and extends along the axis thereof. The vacuum suction passage 6 is connected to a vacuum generator not shown in the drawings.

The suctional attraction roller 5 is provided with a large number of suction holes 7 which communicates at the radially inner ends thereof with the vaccum suction passage 6 and are opened at the radially outer ends thereof in the outside circumferential surface of the suctional attraction roller so that the suction holes act for suctional attraction. The suction holes 7 are located at equal intervals in the axial direction of the suctional attraction roller 5. Suctional attraction pads 8 made of rubber are fixedly fitted in peripheral ports of the suction holes 7.

A motor 12 is attached to the frame 1 by a mounting member 11 so that the rotation of the motor is transmitted to a rotary shaft 14 through a speed reduction mechanism 13 built in the mounting member. The rotary shaft 14 is rotatably supported by bearings 15 in the member 11. An external gear 17 is secured by a key 16 to the rotary shaft 14 at one end thereof. A shaft 18 is secured to the plate 3 near the external gear 17. An external gear 20 engaged with the external gear 17 is rotatably supported by a bearing 19 on the shaft 18. An external gear 21 engaged with the external gear 20 is attached to the end of the suctional attraction roller 15 by a key 22. As a result, the suctional attraction roller 5 is turned by a prescribed angle of about 90° around the axis thereof when the motor 12 is activated. The motor 12, the speed reduction mechanism 13 and the external gears 17, 20 and 21 constitute a mechanism 23 for turning the suctional attraction roller 5 around the axis thereof.

Brackets 31 and 32 are secured to both the sides of the beam 2. Nearly vertical arms 35 and 36 are coupled at the central portions thereof to the brackets 31 and 32 by pins 33 and 34 so that the arms are swingable. The tip of the piston rod 38 of a cylinder 37 is coupled to the upper end of the arm 35 by a pin 39. A bracket 40 on the butt of the cylinder 37 is coupled to the upper end of the other arm 36 by a pin 41.

Pinchers 42 and 43 are secured to the inner sides of the lower portions of the arms 35 and 36 so that the pinchers are moved toward and away from the outside circumferential surface of the suctional attraction roller 5 as the arms 35 and 36 are swung back and forth. The end portions of two band-like materials 44 such as rubber sheets, which are attracted by the suctional attraction roller 5 through suction so as to be used to form a tire, are pinched by one of the pinchers 42 and 43 in cooperation with the suctional attraction roller as will be explained relative to FIG. 3.

Figure 3A:
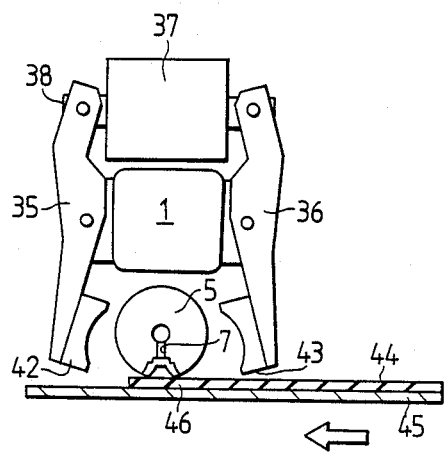
FIGS. 3($a$), 3($b$) and 3($c$) show explanatory views for describing the operation of the invention.

The operation of the device will now described in detail. When the end portions 46 of the two band-like materials 44 conveyed by a conveyor 45 in the direction of an arrow shown in FIG. 2 have reached a place immediately under the suctional attraction roller 5, the conveyor is stopped. At that time, the piston rod 38 of the cylinder 37 remains retracted, and the pinchers 42 and 43 remain away from the suctional attraction roller 5. Next, the frame 1 is down so that the suctional attraction roller 5 is pushed on the end portions 46 of the band-like materials 44 and has the suction holes 7 closed by the end portions of the band-like materials, as shown in FIG. 3(a). At that time, air is sucked through the suction holes 7 and the vacuum suction passage 6 so that the end portion 46 of the band-like materials 44 are attracted by the suctional attraction roller 5 through suction.

Figure 3B:
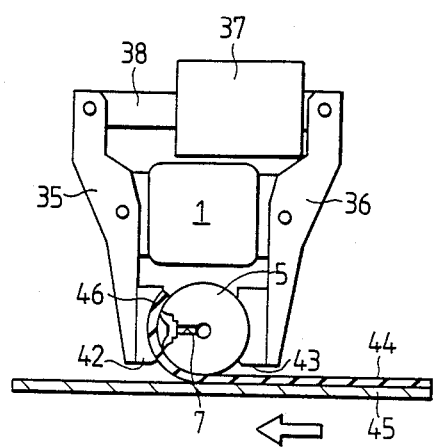

The motor 12 is thereafter put into action so that the suctional attraction roller 5 is turned by the prescribed angle clockwise as to the drawing. At the same time, the frame 1 is moved in the direction of the arrow and the radial direction of the suctional attraction roller 5 at the same speed as the circumferential velocity thereof. As a result, the end portions 46 of the band-like materials 44 are wound upward by about a quarter turn on the outside circumferential surface of the suctional attraction roller 5 as the end portions are attracted by the roller through suction. The piston rod 38 of the cylinder 37 is then protruded so that the arms 35 and 36 are swung and the pinchers 42 and 43 are moved toward the outside circumferential surface of the suctional attraction roller 5. The protrusion of the piston rod 38 is stopped when the pincher 42 has come into contact with the end portions 46 of the band-like materials 44 on the outside circumferential surface of the suctional attraction roller 5 or the other pincher 43 has come into contact with the outside circumferential surface of the roller. The end portions 46 of the band-like materials 44 are thus held at both the sides thereof along the total width thereof by the pincher 42 and the suctional attraction roller 5, as shown in FIG. 3(b).

After that, the frame 1 is moved up and then moved in the direction of the arrow in the drawing, and the conveyor 45 is moved in the same direction synchronously with the movement of the frame so that the band-like materials 44 are fed to a drum 51. At that time, even if the width of each of the band-like materials 44 is so small as to open some of the suction holes 7 to reduce the suctional attraction power of the suctional attraction roller 5 or a strong external force acts to the band-like materials, the materials can be surely and continuously held in a fixed position because the end portions 46 of the materials are pinched at both the sides thereof by the pincher 42 and the suctional attraction roller.

Figure 3C:
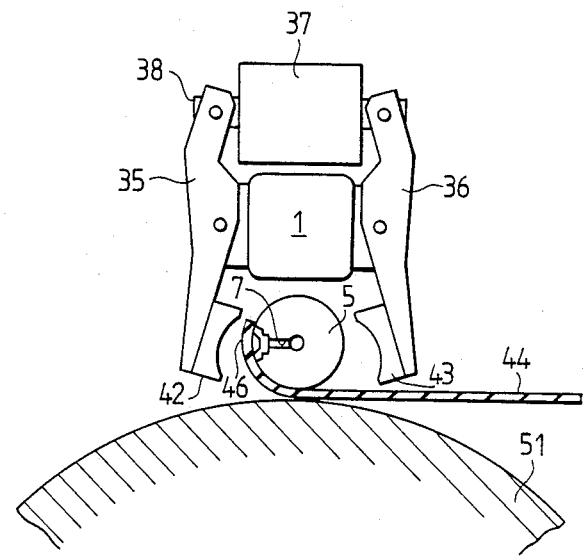

The frame 1 is thereafter moved down so that the end portions 46 of the band-like materials 44 are put into pressure contact with the surface of the drum 51. The piston rod 38 of the cylinder 37 is then retracted so that the end portions 46 of the band-like materials 44 are released from the pincher 42 and the suctional attraction roller 5, as shown in FIG. 3(c).

After that, the drum 51 is rotated clockwise, and the suctional attraction roller 5 is turned by the prescribed angle counterclockwise by the motor 12, so that the end portions 46 of the band-like materials 44 wound on the outside circumferential surface of the roller are transferred therefrom onto the drum in pressure contact therewith.

After the vacuum generator is stopped, the frame 1 is moved back to the initial position thereof. At the same time, the drum 51 is rotated counterclockwise so that the band-like materials 44 are wound on the outside circumferential surface of the drum.

Thus, the band-like materials 44 are picked up from the conveyor 45 and set on the drum 51, without manual work, to greatly promote automation.

Since the end portions 46 of the band-like materials 44 are held without being plastically deformed, the end portions can be uniformly conjoined to each other.

Although the suctional attraction roller 5 is forcibly turned by the means 23 in the above-described embodiment, the present invention is not confined thereto but may be otherwise embodied so that the suctional attraction roller can freely turn and the turning thereof can be braked to stop if necessary. As for the latter embodiment, the suctional attraction roller is turned by the friction on the band-like materials.

Although the pinchers 42 and 43 are provided at both the sides of the suctional attraction roller 5 in the above-described embodiment, the present invention is not confined thereto but may be otherwise embodied so that the pincher is provided at only one side of the suctional attraction roller.

We claim:

1. A device for holding an end portion of a band-like material comprising:
   a frame;
   a suctional attraction roller rotatively supported by said frame and having a suctional attraction part at the periphery of said roller; and a pincher supported by said frame and movable toward and away from the peripheral surface of said roller;

said end portion of said material attached by said roller through suction, means to rotate said roller so that said end portion is wound upward, and means to move said pincher toward said roller so that said end portion is held by said pincher and said roller.

2. The device of claim 1, wherein said suctional attraction roller is provided with a plurality of suction holes located at equal intervals in an axial direction of said suctional attraction roller.

3. The device of claim 2, wherein said suctional attraction roller has suctional attraction pads made of rubber, said pads fitted in peripheral ports of said suction holes.

4. The device of claim 1 wherein said means to rotate said roller comprises a motor having an output shaft, said motor mounted on said frame and gear means coupled to said output shaft for rotating said suctional attraction roller.

5. The device of claim 1 wherein said means to move said pincher comprises a cylinder mounted on said frame said cylinder having an output rod, said pincher having a pair of arms, one of said arms coupled to said output rod to selectively move toward said roller.

6. The device of claim 1 wherein said roller is free turning and said means to rotate comprises frictional contact with said band-like material as said band like material is conveyed to said device.

* * * * *